(No Model.)

E. W. ECKERT.
MANUFACTURE OF EYE BARS.

No. 308,348. Patented Nov. 25, 1884.

Witnesses,
J. H. Burridge
C. H. Turney

Inventor,
E. W. Eckert
W. H. Burridge
Atty

UNITED STATES PATENT OFFICE.

EDWARD WILLIAM ECKERT, OF MASSILLON, OHIO.

MANUFACTURE OF EYE-BARS.

SPECIFICATION forming part of Letters Patent No. 308,348, dated November 25, 1884.

Application filed January 22, 1884. (No model.)

*To all whom it may concern:*

Be it known that I, EDWARD W. ECKERT, of Massillon, in the county of Stark and State of Ohio, have invented a certain new and useful Improvement in the Manufacture of Eye-Bars; and I do hereby declare that the following is a full and complete description thereof.

The improvement in eye-bars above referred to has especial reference to the method of forming the eyes on the ends of the bars. The matter to be accomplished in eye-bars is to make the finished eyes as strong as the body of the bar, and to make them as small as possible in diameter and thickness, to admit of their use in confined positions, and to produce a minimum bending moment on the pin to which they may be attached; also thereby to reduce the weight of eye-bars and length of pin required in their use.
It is proposed to accomplish the above-described objects by so constructing the eyes as to obtain a continuation of the fibers of the bar around the pin-hole, thus preserving the maximum strength of the material forming the eye.

The invention is described more fully in the following specification, and shown more clearly in the accompanying drawings, which illustrate several modifications of the principle employed in the manufacture of eye-bars without changing the nature of the invention.

Figure 1:
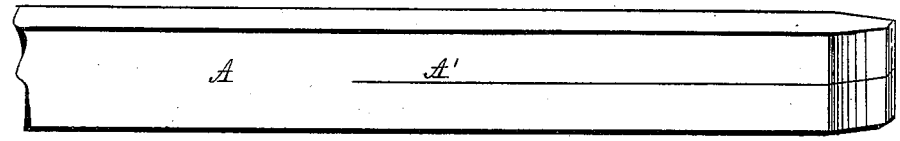
Figure 2:
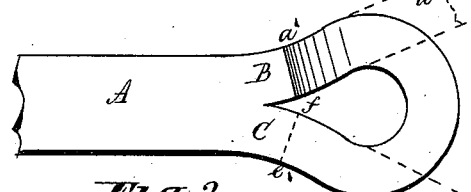
Figure 4:
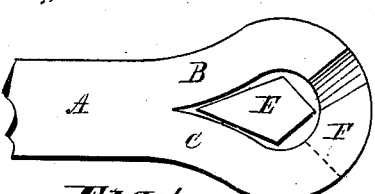
Figure 5:
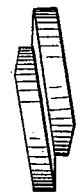
Figure 3:
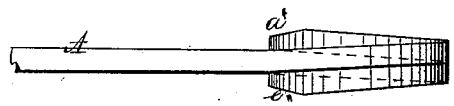
Figure 6:
Figure 7:
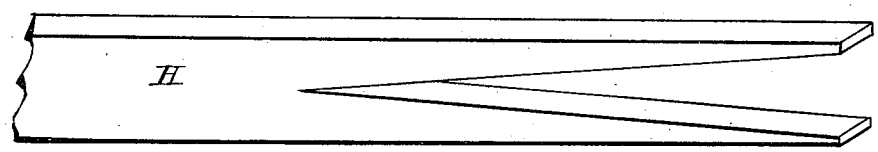
Figure 8:
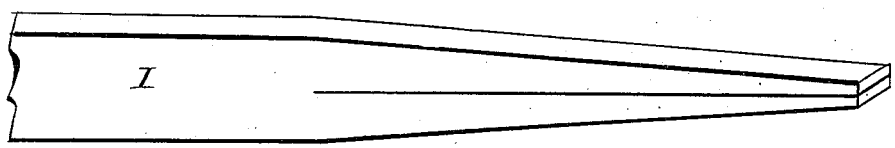
Figure 9:
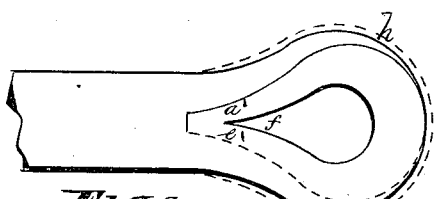
Figure 11:
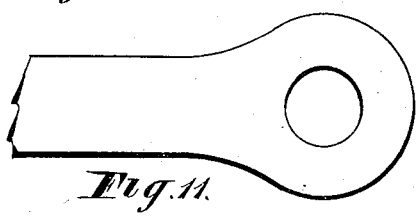
Figure 10:
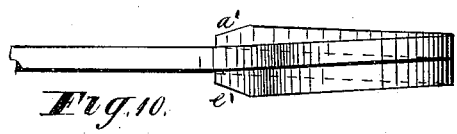
Figure 12:
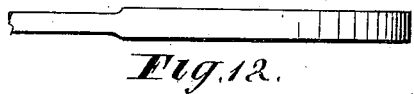

Figure 1 represents a perspective view of one end of a bar, A, sheared or split along the line A', and showing the ends thereof scarfed.
Fig. 2 is a plan view of the bar A in the form required for forging. Fig. 3 is a side elevation of Fig. 2. Fig. 4 shows a plan of a bar bent ready for forging by means of dies, with a re-enforcing piece in the eye. Fig. 5 is an end elevation of Fig. 4. Fig. 6 is the same as Fig. 4, except in the shape of the re-enforcing piece in the eye. Figs. 7 and 8 are modifications of Fig. 1. Figs. 9 and 10 give a plan and side elevation of the bars shown in Figs. 7 and 8 when bent into form, ready for forging into dies. Figs. 11 and 12 are a plan and a side elevation of a finished eye on the end of a bar.

The end of the bar A, Fig. 1, is first prepared by shearing or splitting, preferably while hot, as shown by the line A'. The two ends or arms thus formed are then spread apart, as indicated by the dotted lines a and e, Fig. 2. Said arms are then bent around a pin or former, so that the end of the arm C will lap over upon the arm B, as shown at a', Fig. 2, while the arm B continues around under the arm C, ending at the dotted line e'. The arms thus lapped upon each other are shown in Fig. 3. The end of the bar thus bent or prepared is reheated and hammered or pressed into dies, making the eye ready for drilling the pin-hole, as shown in Figs. 11 and 12. It will be proper to remark here that the slit A' in Fig. 1 is of such a length as to give the material required to make the eye and to fill the die all around the center, including the angular space at f, Fig. 2.

A modification of the above-described process is shown in Figs. 4 and 5, in which the arms of a bar do not overlap each other to an extent sufficient to fill the dies, and the deficiency in material is made up by the insertion of a re-enforcing piece, E, Fig. 4, which is forged into the body of the eye when the lap at F is being welded in the dies. In this case the rough hole may be formed by punching while forging; or the eyes may be made solid and afterward drilled.

Instead of using the re-enforcing piece E, a bent piece of metal, G, may be inserted in the eye, as shown in Fig. 6. This latter method of filling the eyes is considered preferable to that shown in Fig. 4, because the fibers in this case will be parallel to the outline of the eye.
Figs. 7 and 8 represent perspective views of two further modifications of preparing the ends of bars before bending into eyes.

The bar H in Fig. 7 has a wedge-shaped piece cut out along its center line instead of the simple slit A' of bar A, Fig. 1, whereas the bar I in Fig. 8 is split as in Fig. 1, but has triangular pieces cut from each edge. The ends of the bars H and I (shown in Figs. 7 and 8, respectively) are then spread apart, as are the ends of the bar A in Fig. 1, and bent in the same manner as the bar A, producing an eye, as shown in Figs. 9 and 10, ready for forging. The long tapered ends shown in Figs. 7 and 8 are so proportioned as to distribute the material around the center in bending the eye before forging, thereby placing the proper amount of said material at each point required to fill the die at that point, as shown in the plan and side elevation in Figs. 9 and 10, the outer dotted circle, $h\ h$, in Fig. 9 representing the size of the die into which the eyes are forged, producing the finished eye shown in Figs. 11 and 12.

It will be proper to add here that the ends of all of the above bars may be scarfed to facilitate welding, and, furthermore, that the forging-dies above alluded to are not shown in the drawings, as they form no part of this invention, said dies being simply such as will give the desired shape to the eye, and operated by any suitable mechanism.

What I claim as my invention, and desire to secure by Letters Patent, is—

1. In the manufacture of eye-bars for bridges and other structures, the herein-described method of constructing the eyes so as to obtain a continuation of the fibers of the bar around the center or pin hole, thus utilizing the maximum strength of the material forming the eye by first longitudinally splitting and shaping the ends of the bar, then spreading and bending the arms thus formed around a pin or former, so that the end of one arm may lap over the end of the other, and then forging the same in suitable dies, substantially as herein set forth.

2. In the manufacture of eye-bars for bridges and other structures, forming the eye by splitting and shaping the end of the bars, and spreading, bending, and overlapping the arms thus formed, and inserting re-enforcing pieces in the intervening space or crotch of the eye, and forging the same in dies, in the manner and for the purposes substantially as herein set forth.

In testimony whereof I affix my signature in presence of two witnesses.

EDWARD WILLIAM ECKERT.

Witnesses:
J. H. BURRIDGE,
C. H. TURNEY.